United States Patent
Kang

(10) Patent No.: US 9,247,591 B2
(45) Date of Patent: Jan. 26, 2016

(54) LIGHT SOURCE DRIVING APPARATUS, LIGHT SOURCE DRIVING METHOD, AND DISPLAY APPARATUS

(71) Applicant: Samsung Electronics Co., Ltd., Suwon-si (KR)

(72) Inventor: Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/250,676

(22) Filed: Apr. 11, 2014

(65) Prior Publication Data

US 2015/0061531 A1    Mar. 5, 2015

(30) Foreign Application Priority Data

Sep. 3, 2013  (KR) .......................... 10-2013-0105489

(51) Int. Cl.
*G09G 3/34*    (2006.01)
*H05B 33/08*   (2006.01)

(52) U.S. Cl.
CPC ................ *H05B 33/08* (2013.01); *G09G 3/342* (2013.01)

(58) Field of Classification Search
CPC .................................................... G09G 3/3406
USPC .......... 315/224, 294, 297, 307, 313, 210, 186
See application file for complete search history.

(56) References Cited

U.S. PATENT DOCUMENTS

| | | | |
|---|---|---|---|
| 5,736,842 A * | 4/1998 | Jovanovic | ..................... 323/222 |
| 5,991,172 A | 11/1999 | Jovanovic et al. | |
| 7,535,207 B2 | 5/2009 | Darroman | |
| 7,659,673 B2 | 2/2010 | Lys | |

* cited by examiner

*Primary Examiner* — Daniel D Chang
(74) *Attorney, Agent, or Firm* — Sughrue Mion, PLLC

(57) ABSTRACT

A light source driving apparatus and method of driving a light source are provided. The light source driving apparatus includes a light source configured to generate light, a power source configured to generate power; an inductor which is connected in series between the power source and the light source; a switch which is connected in parallel to the light source and between the inductor and the light source; and a controller configured to turn on the switch at a point of time when a resonance voltage applied between opposite terminals of the switch is zero in a resonance circuit formed by the inductor and the switch after turning off the switch.

19 Claims, 12 Drawing Sheets

LIGHT SOURCE DRIVING APPARATUS, LIGHT SOURCE DRIVING METHOD, AND DISPLAY APPARATUS

CROSS-REFERENCE TO RELATED APPLICATION

This application claims priority from Korean Patent Application No. 10-2013-0105489, filed on Sep. 3, 2013 in the Korean Intellectual Property Office, the disclosure of which is incorporated herein by reference.

BACKGROUND

1. Field

Apparatuses and methods consistent with the exemplary embodiments relate to a light source driving method for operating a light source driving apparatus of a display apparatus with high efficiency, and more particularly, to a light source driving apparatus that reduces energy to be consumed in operating a light source driving apparatus employing a tapped-inductor boost converter (TIBC).

2. Description of the Related Art

A liquid crystal display (LCD) television (TV) or the like display apparatus includes a light emitting diode (LED) or the like light source as a backlight for illuminating an image. The display apparatus includes a light source driving circuit as a means for driving the light source, in which the light source driving circuit controls an electric current supplied to the light source to emit a desired quantity of light.

A method of controlling the quantity of light from the light source, i.e., a dimming method, includes a pulse width modulation (PWM) dimming method where a duty rate of the electric current supplied to the light source is adjusted, an analog dimming method where a peak value of the electric current is adjusted, and so on.

The light source driving circuit may be, for example, a general boost converter (BC) type light source driving circuit, or a general tapped inductor boost converter (TIBC) type light source driving circuit.

SUMMARY

One or more exemplary embodiments provide a high-efficiency light source driving circuit of a display apparatus.

Further, one or more exemplary embodiment provide a light source driving circuit of a display apparatus, in which power loss due to charging/discharging of a capacitor Cds of a switching device is minimized when the switching device is turned on/off.

Further still, one or more exemplary embodiments provide a light source driving circuit of a display apparatus, which can detect a point of time when voltage applied between opposite terminals of a switching device in a resonance circuit formed between a reactor and a switching device after the switching device is turned off.

According to an aspect of an exemplary embodiment, there is provided a light source driving apparatus including a power source which generates power for driving a light source; an inductor which is connected in series between the power source and an output to the light source; a switch which is connected in parallel to the light source between the inductor and the output to the light source; and a controller which turns on the switch at a point of time when a resonance voltage applied between opposite terminals of the switch is zero in a resonance circuit formed by the inductor and the switch after turning off the switch.

The controller may detect an electric current flowing in the switch in order to determine the point of time when the resonance voltage is zero.

The controller may detect whether the electric current flowing in the switch is changed from negative to positive.

The switch may include a metal oxide semiconductor field effect transistor (MOSFET), and a resistor may be connected in series to a source terminal of the MOSFET.

The resonance voltage applied between the opposite terminals of the MOSFET may become zero when a body diode of the MOSFET is reverse-biased after the MOSFET is turned off.

The MOSFET may have a duty rate of about 0.5 or higher.

The controller may include a comparator which receives the electric current flowing in the MOSFET after the MOSFET is turned off and compares the received electric current of the MOSFET with a reference input.

The reference input may include a ground input.

The controller may include a first SR flip-flop of which a Q output is connected to a gate terminal of the MOSFET; a first comparator of which an output is connected to a reset input of the first SR flip-flop, a first input receives the electric current from the source terminal of the MOSFET, and a second input receives a reference current; a second comparator which is the transition comparator, the second comparator having a first input that receives the reference input, and a second input that receives the electric current from the source terminal of the MOSFET; an AND gate of which a first input receives an output from the second comparator, and a second input receives a Qbar output from the first SR flip-flop; a second SR flip-flop of which a set terminal receives an output from the AND gate; and a third comparator of which a first input receives the electric current flowing in the source terminal of the MOSFET, and a second input receives a Qbar output of the second SR flip-flop. The output of the third comparator may be input to a set terminal of the first SR flip-flop, and the Q output of the first SR flip-flop may be connected to a reset terminal of the second SR flip-flop.

The light source driving apparatus may further include a blanking section between the Qbar output of the first SR flip-flop and the second input of the AND gate.

According to an aspect of another exemplary embodiment, there is provided a method of driving a light source driving apparatus including a power source which generates power for driving a light source, an inductor which is connected in series between the power source and an output to the light source, and a switch which is connected in parallel to the light source between the inductor and the output to the light source, the method including turning off the switch; determining at a point of time when a resonance voltage applied between opposite terminals of the switch is zero in a resonance circuit formed by the inductor and the switch after turning off the switch; and turning on the switch at the point of time when the resonance voltage is zero.

The method may further include detecting an electric current flowing in the switch in order to determine the point of time when the resonance voltage is zero.

The resonance voltage may become zero when the electric current flowing in the switch is changed from negative to positive.

The switch may include a metal oxide semiconductor field effect transistor (MOSFET), and a resistor may be connected in series to a source terminal of the MOSFET.

The resonance voltage applied between the opposite terminals of the MOSFET may become zero when a body diode of the MOSFET is reverse-biased after the MOSFET is turned off.

The MOSFET may have a duty rate of about 0.5 or higher.

The method may further include receiving the electric current flowing in the MOSFET after the MOSFET is turned off, and comparing the received electric current of the MOSFET with a reference input.

The reference input may include a ground input.

According to an aspect of another exemplary embodiment, there is provided a display apparatus including a display panel which displays an image; a light source which emits light to the display; and a light source driver which drives the light source to control a quantity of light emitted from the light source, the light source driver including a power source which generates power; an inductor which is connected in series between the power source and the light source; a switch which is connected in parallel to the light source between the inductor and the light source; and a controller which turns on the switch at a point of time when a resonance voltage applied between opposite terminals of the switch is zero in a resonance circuit formed by the inductor and the switch after turning off the switch.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings. The following exemplary embodiments describe only configurations directly related to the present inventive concept, and the descriptions of the other configurations will be omitted. However, it will be understood that the omitted configurations are not unnecessary in realizing an apparatus or system to which the inventive concept is applied. Further, like numerals refer to like elements throughout.

Figure 1:
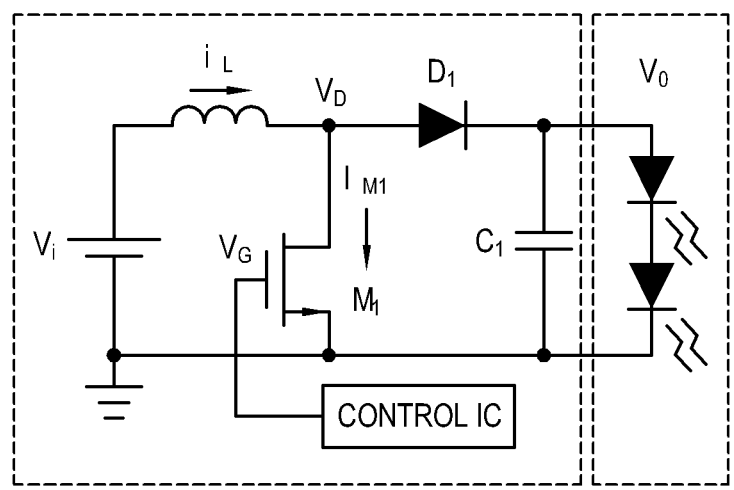
FIG. 1 is a circuit diagram showing a general boost converter (BC) type light source driving circuit.
Figure 2:
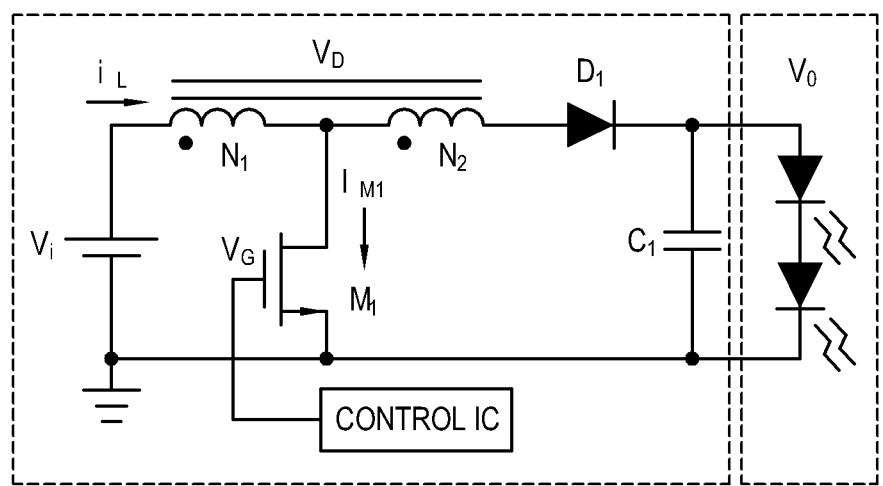
FIG. 2 is a circuit diagram showing a general tapped inductor boost converter (TIBC) type light source driving circuit.

FIGS. 1 and 2 respectively illustrate examples of LED driving circuits formed by a general boost converter (BC) used in a boost LED driving circuit, and a tapped-inductor boost converter (TIBC) showing a high input/output boost characteristic.

In the case of the general BC driving circuit of FIG. 1, a ratio of input/output voltages is as follows.

$$Vo/Vi = 1/(1-D)$$

Meanwhile, in the case of the TIBC driving circuit of FIG. 2, a ratio of input/output voltages is as follows.

$$Vo/Vi = 1(1+D*N2/N1)/(1-D)$$

where, Vo denotes an output voltage, Vi denotes an input voltage, and D denotes a turn-on duty rate of a metal oxide semiconductor field effect transistor (MOSFET) M1.

Also, N1 and N2 are primary and secondary winding numbers, respectively, of the tapped inductor of the TIBC driving circuit of FIG. 2.

Referring to the foregoing ratios of the input/output voltages, the TIBC driving circuit shows a higher input/output voltage ratio than the conventional BC driving circuit with respect to the same duty rate.

Figure 3:
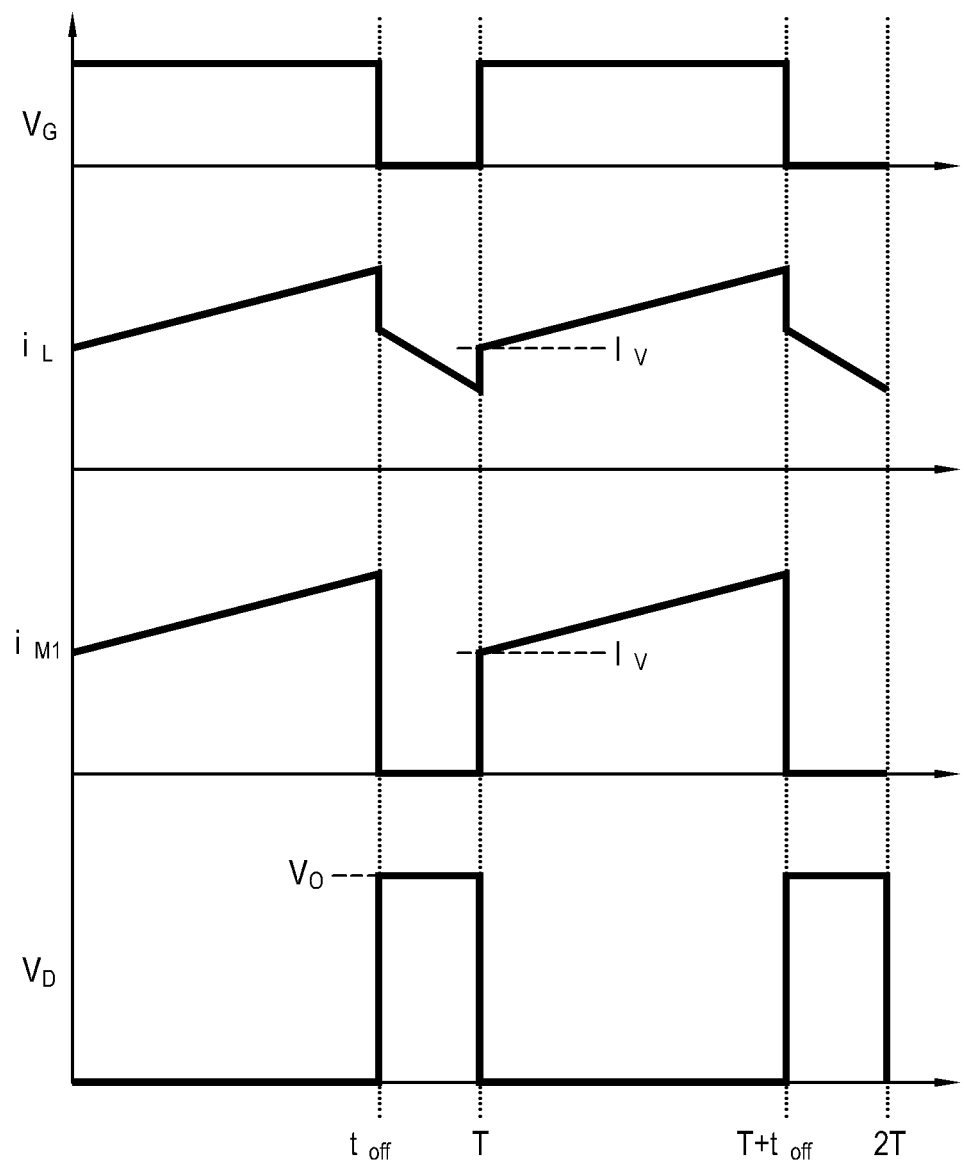
FIG. 3 shows an example of waveforms in operations under a continuous conduction mode (CCM) of the TIBC type driving circuit of FIG. 2.

FIG. 3 shows an example of waveforms during operation of the TIBC driving circuit. These waveforms show operations in a typical continuous conduction mode (CCM), in which an electric current iL of the inductor is always higher than 0 during a normal operation.

Figure 4:
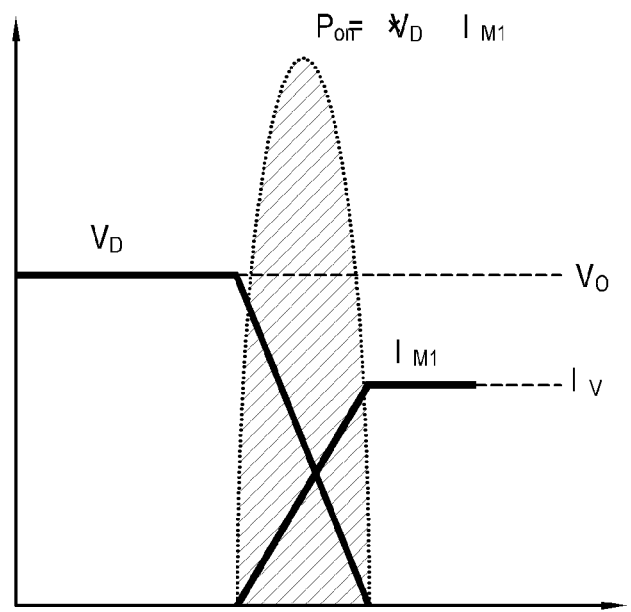
FIG. 4 shows turned-on switching loss in a metal oxide semiconductor field effect transistor (MOSFET) of FIG. 3.
Figure 5:
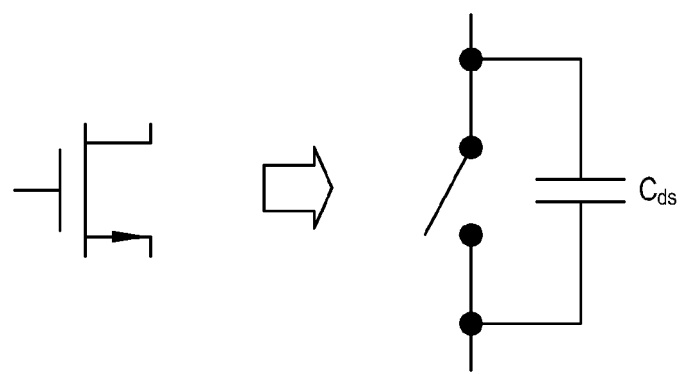
FIG. 5 shows an equivalent circuit diagram of the MOSFET of FIG. 2.

FIG. 3 shows simplified ideal waveforms in which parasitic components of circuit parts or practical limited switching time are ignored. At a point of time when the metal oxide semiconductor field effect transistor (MOSFET) is turned on, a voltage vD and an electric current iM1 applied between opposite terminals of the MOSFET have decreased and increased waveforms, respectively. Because some time is taken in these operations, power loss based on multiplication of the electric current and voltage occurs as shown in FIG. 4. Also, the turned-off MOSFET serves as a capacitor having certain capacity as shown in FIG. 5, and thus energy (i.e., 0.5*Cds*Vds*Vds) charged in this capacitor Cds is exhausted inside the MOSFET when the MOSFET is turned on, thereby contributing to the power loss.

As described above, when the MOSFET is turned on, loss due to the limited gradient of the electric current and voltage and loss due to capacity between the opposite terminals of the MOSFET arise. Under the same load conditions, the more the ratio of input and output voltages increases, the higher the input current becomes. The higher input current causes Iv to become higher, and thus the electric current varies widely at the point of time when the MOSFET is turned on, thereby causing disadvantages of current/voltage noise or electromagnetic interference (EMI) due to parasitic components in the circuit. Further, in the turned-on switching loss, the loss due to the limited gradient of electric current and voltage depends on the input current and the output voltage. In general, a MOSFET having a lower on-resister Ron is used as the input current increases. However, the lower the on-resistor Ron becomes, the higher the capacitor Cds becomes. As a result, loss due to charging/discharging of the capacitor Cds increases, and therefore turned-on power loss in the MOSFET becomes very serious. In this case, a discontinuous conduction mode (DCM) method where the MOSFET is turned on after the electric current of the inductor L becomes 0 may be considered rather than the foregoing CCM method where the MOSFET is turned on before the electric current of the inductor L becomes 0.

Figure 6:
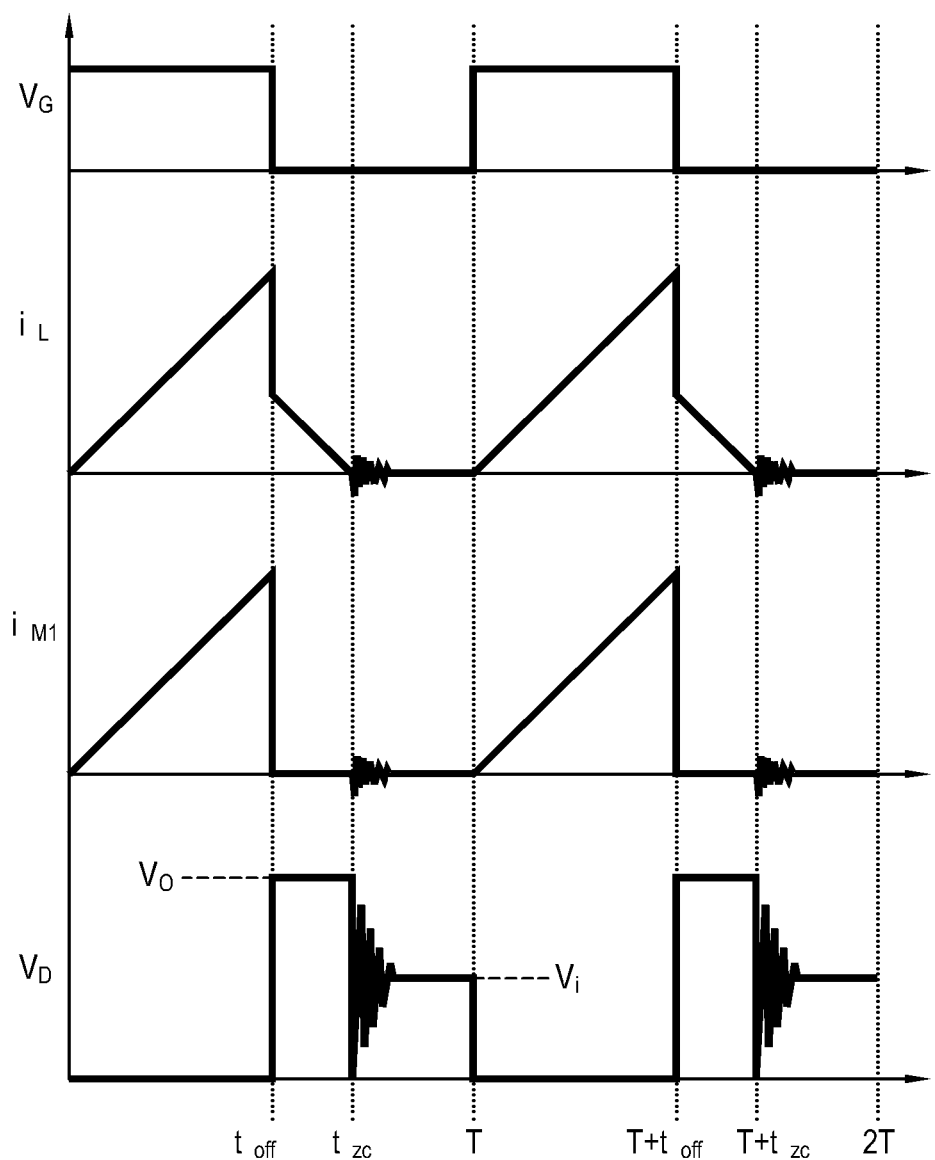
FIG. 6 shows an example of waveforms in operations under discontinuous conduction mode (DCM) of the TIBC type driving circuit of FIG. 2.
Figure 7:
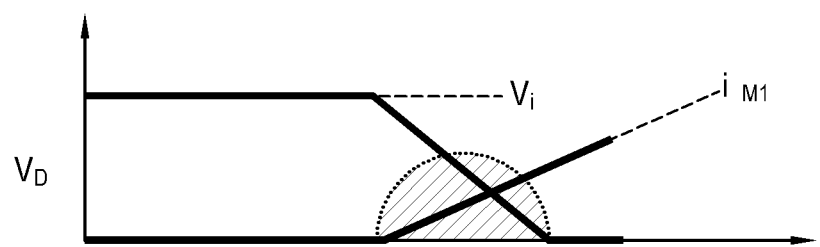
FIG. 7 shows turned-on switching loss in the MOSFET of FIG. 6.

FIG. 6 shows an example of waveforms during operation of the TIBC driving circuit of FIG. 2 under the DCM. If the MOSFET is turned off at a point of time toff, an electric current iL of the inductor L gradually decreases and becomes 0 at a point of time tzc. Then, vD converges to Vi after slight ringing due to the parasitic component of the circuit. If the MOSFET is turned on at a point of time T, iM1 is increased with a somewhat gentle gradient determined by the inductor L as opposed to the foregoing case of the CCM and vD applied between the opposite terminals of the MOSFET is also decreased from not Vo but Vi as opposed to the foregoing case of the CCM. Therefore, as shown in FIG. 7, the loss due to the limited gradient of the electric current and voltage under the DCM operations is relatively small as compared with that under the CCM operations. However, energy charged in the capacitor Cds is partially exhausted in the form of the ringing at the point of time tzc, and the other is exhausted by the turn-on at the point of time T. Accordingly, there is no difference between the CCM and the DCM with respect to the power loss due to the charging/discharging of the capacitor Cds.

Figure 8:
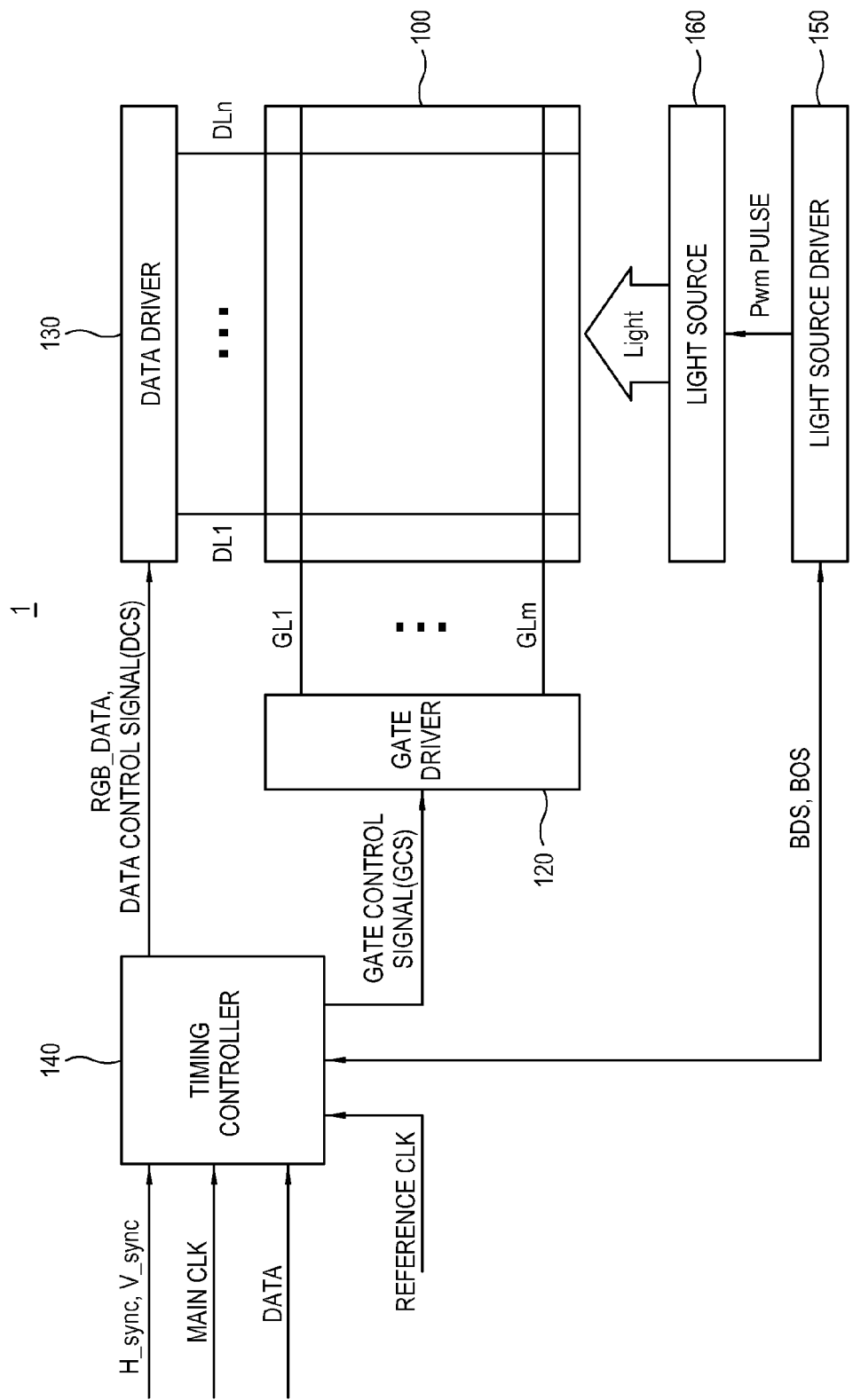
FIG. 8 is a block diagram of a display apparatus according to an exemplary embodiment.

FIG. 8 is a block diagram of a display apparatus according to an exemplary embodiment. As shown in FIG. 8, a display apparatus 1 includes a display panel 100 for displaying an image signal, panel drivers including a gate driver 120 and a data driver 130 for driving the display panel 100, a light source for emitting light to the display panel 100, a light source driver 150 for controlling the brightness of the light emitted from the light source 160 in accordance with a dimming signal, and a timing controller 140 for controlling the timing of the image signal of the display panel 100.

The display apparatus 1 may further include an image processor, a decoder, a graphic processor, a communicator, etc., descriptions of which will be omitted.

The display panel 100 includes a plurality of gate lines GL1 to GLm and data lines DL1 to DLn intersecting each other, thin film transistors formed at these intersections, and liquid crystal capacitors connected to the thin film transistors. Although it is not shown, the thin film transistor includes a gate electrode branched from the plurality of gate lines GL1 to GLm, a semiconductor layer formed on the gate electrode with an insulating layer between the semiconductor layer and the gate electrode, a source electrode branched from the plurality of data lines DL1 to DLn, and a drain electrode opposite to the source electrode. Such a thin film transistor controls the liquid crystal capacitor.

The gate driver 120 supplies scan signals in sequence to the plurality of gate lines GL1 to GLm in response to a gate control signal GCS generated in the timing controller 140. By the scan signal, the thin film transistors connected to the plurality of gate lines GL1 to GLm are turned on. The data driver 130 supplies a data signal to the plurality of data lines DL1 to DLn in response to a data control signal DCS generated by the timing controller 140.

The timing controller 140 receives a horizontal sync signal H_sync and a vertical sync signal V_sync for determining a frame frequency of the display panel 100, image data DATA, a main clock MAIN CLK, and a reference clock REFERENCE CLK. The timing controller 140 converts image data DATA in accordance with formats used by the data driver 130 and supplies pixel data RGB_DATA to the data driver 130. The timing controller 140 supplies a gate control signal GATE CONTROL SIGNAL (GCS) for controlling the gate driver 120 and a data control signal DATA CONTROL SIGNAL (DCS) for controlling the data driver 130 to the gate driver 120 and the data driver 130, respectively. Also, the timing controller 140 modulates the horizontal sync signal H_sync and the vertical sync signal V_sync based on the reference clock, and supplies a dimming signal BDS and a light source driving signal BOS to the light source driver 150 based on the horizontal sync signal H_sync and the vertical sync signal V_sync.

The light source 160 is located at a side of the display panel 100, such as the lower side, and emits light to the display panel 100 using power received from the exterior. The light source 160 may be achieved by a light emitting diode (LED), a fluorescent lamp, etc. of which brightness is controlled in response to the dimming signal BDS.

The light source driver 150 controls electric current applied to the light source 160 by a pulse width modulation (PWM) method in accordance with an external brightness control command, thereby controlling the brightness of the light source 160. For example, the light source driver 150 may control the electric current for the light source, using the dimming signal BDS received from the timing controller 140.

Below, a light source driver according to an exemplary embodiment will be described in detail with reference to FIGS. 9 to 12.

Figure 9:
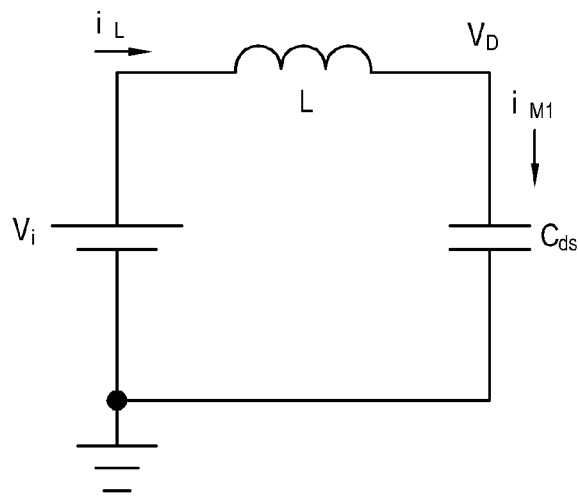
FIG. 9 shows an example of a resonance circuit formed directly after electric current flowing in an inductor of the DCM TIBC becomes 0.

As shown in FIG. 9 and with additional reference to FIG. 6, at a point of time toff when the MOSFET M1 is turned off, an electric current iL of the inductor N1 gradually decreases and becomes 0 at a point of time tzc. At this time, the MOSFET M1 is reverse-biased, and forms the resonance circuit which includes an input voltage Vi, an inductance L of the inductor N1 at a primary side, and an output capacity component Cds of the MOSFET. The inductor current iL has an initial value of 0, and the output capacity component Cds of the MOSFET has an initial value of Vo.

Figure 10:
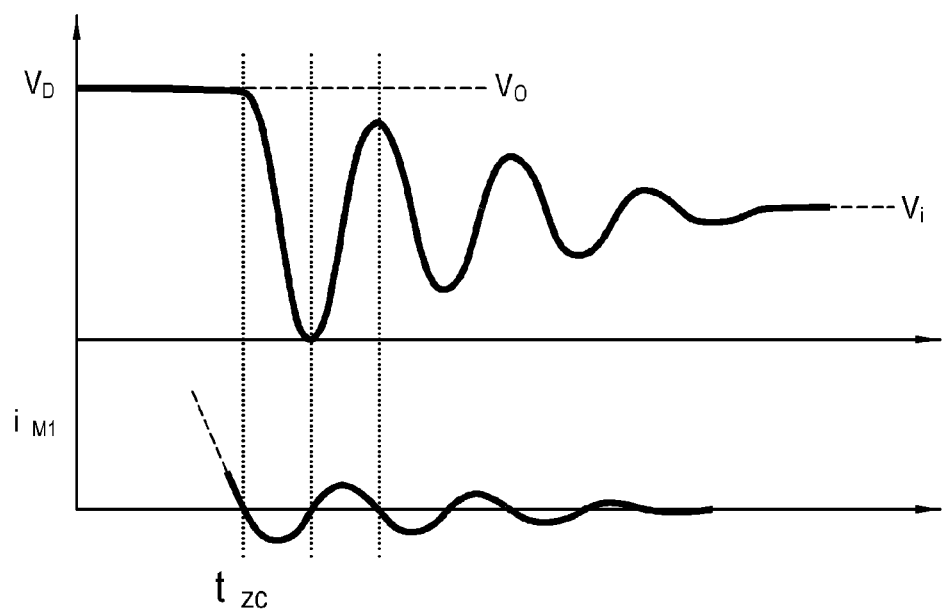
FIG. 10 shows waveforms of a resonance current and a resonance voltage in the resonance circuit of FIG. 9.

FIG. 10 shows resonance waveforms in more detail at the point of time tzc in FIG. 6. In an ideal case where parasitic components of the circuit are ignored, the amplitude of the resonance waveform shown in FIG. 10 continuously alternates without being attenuated even though time goes on. However, in the practical circuit, resonance occurs due to parts on the circuit board and a minute resistance of the circuit board, thereby gradually attenuating the amplitude.

The resonance circuit of FIG. 9 can be expressed as follows.

$$v_D(t) = \frac{DV_i}{1-D}\cos\frac{t}{\sqrt{LC_{ds}}} + V_i$$

$$i_L(t) = -\frac{DV_i}{1-D}\sqrt{\frac{C_{ds}}{L}}\sin\frac{t}{\sqrt{LC_{ds}}}$$

The foregoing expression does not consider the parasitic components of the circuit, and thus the attenuation of the amplitude is not shown. Therefore, the foregoing expression produces a significant error from the practically measured amplitude after an initial one or two cycles.

Regarding the relationship between the amplitude of vD, i.e., $DV_i/(1-D)$ and Vi, if the amplitude $DV_i/(1-D)$ is greater than Vi, the minimum value of vD is smaller than 0 and negative. At this time, in the practical circuit, a body diode provided in the MOSFET M1 in a reversed direction is turned on, thereby having a section during which vD is maintained at 0 V. This condition is satisfied when the MOSFET M1 has a duty rate D of about 0.5 or higher, and the resonance waveform at this time is as shown in FIG. 11.

Figure 11:
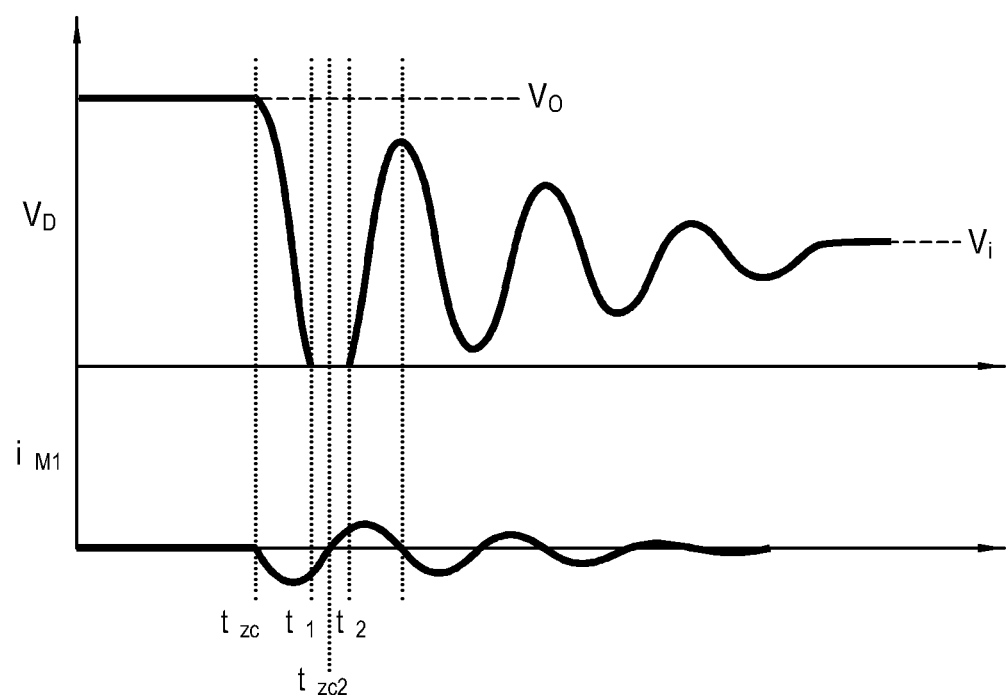
FIG. 11 shows waveforms of a resonance current and a resonance voltage.

As shown in FIG. 11, if voltage is applied to the gate of the MOSFET M1 within a section t1~t2 where the body diode of the MOSFET M1 is turned on and vD is maintained at 0, the MOSFET M1 can be turned on without switching loss.

Figure 12:
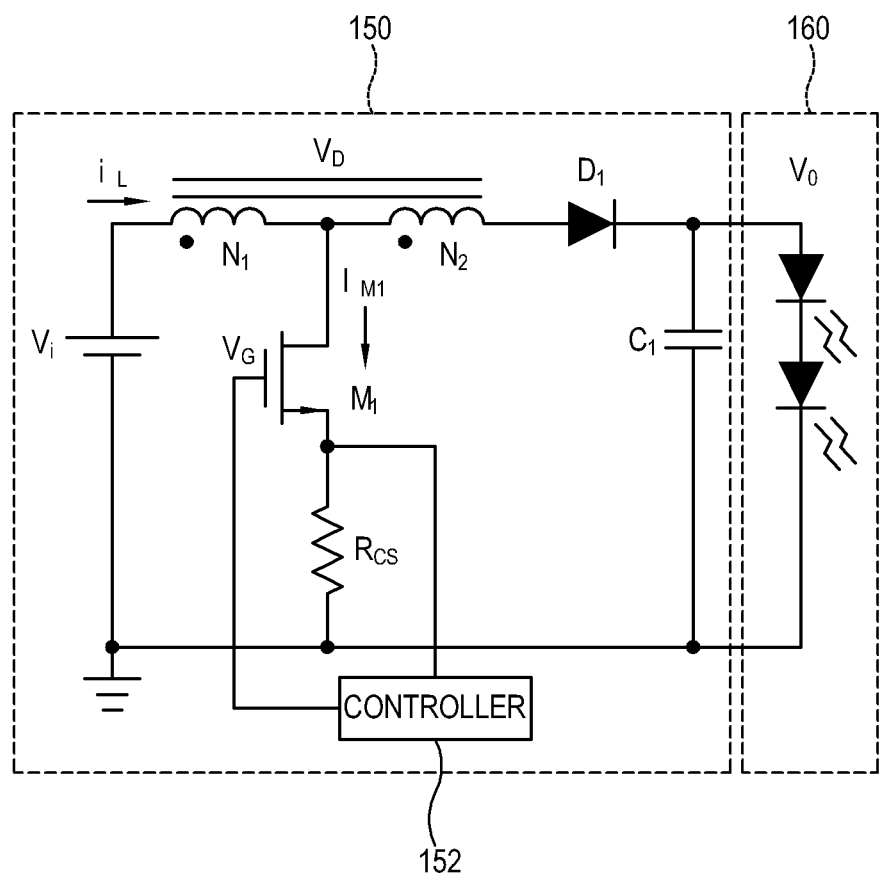
FIG. 12 is an example of a circuit diagram showing a light source driving apparatus according to an exemplary embodiment.

FIG. 12 is an example of a circuit diagram showing a light source driving apparatus according to an exemplary embodiment. The light source driving apparatus of FIG. 12 is a TIBC type light source driving circuit. As shown in FIG. 12, a light source driving circuit 150 drives a light source 160 such as an LED. The light source driving circuit 150 may include a power source Vi, a capacitor C1 connected in parallel to the light source 160, a diode D1 connected in series to the capacitor C1, a primary inductor N1 and secondary inductor N2 connected in series between the power source Vi and the diode D1, a MOSFET M1 connected in parallel to the light source 160 between the primary inductor N1 and the light source 160, a resistor Rcs connected to a source terminal of the MOSFET M1, and a controller 152 connected to a gate terminal and the source terminal of the MOSFET M1.

The controller 152 controls the MOSFET M1 to be turned on/off, so that the MOSFET M1 can follow a target value of the current or voltage supplied to the light source 160. The controller 152 may be achieved by a single chip, such as for example, an implementation by a control integrated circuit (IC), but is not limited thereto. Alternatively, the controller 152 may be achieved by mounting a plurality of parts on a printed circuit board (PCB).

According to an exemplary embodiment, the controller 152 is connected to the gate terminal of the MOSFET M1 in order to turn on/off the MOSFET M1, and connected to the source terminal of the MOSFET M1 so as to detect the electric current of the MOSFET M1. Alternatively, vD may be checked in real time instead of sensing the electric current of the MOSFET M1, and a checking result may be given to the controller 152. However, as the voltage vD becomes higher, the expense of the parts to check the voltage vD in real time increases.

In FIG. 12, the MOSFET M1 is turned off to make the electric current iL of the inductor L become 0, and then turned on again if a zero-voltage switching condition is satisfied after a lapse of very short time. Thus, the light source driving circuit 150 according to an exemplary embodiment operates in a boundary conduction mode between the CCM and the DCM.

Figure 13:
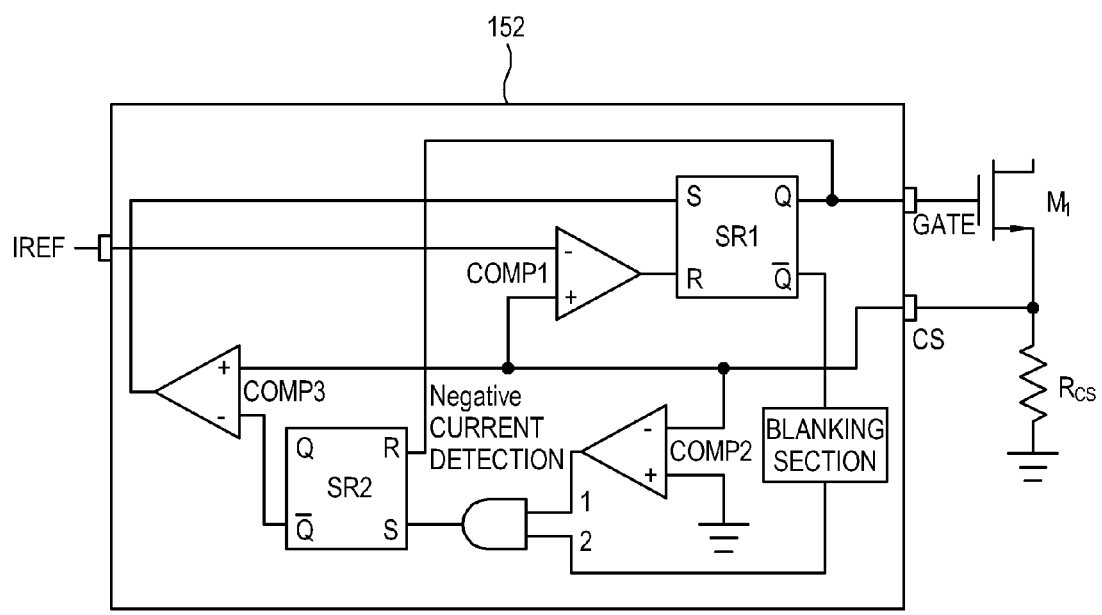
FIG. 13 shows an example of a configuration of a controller according to an exemplary embodiment.

FIG. 13 shows an example of a configuration of the controller according to an exemplary embodiment. The controller 152 turns on the MOSFET M1 by detecting a point of time when vD is maintained at 0 after the MOSFET M1 is turned off. Thus, the controller 152 senses an electric current of the MOSFET M1 and detects a point of time when vD is maintained at 0. One of ordinary skill in the art will appreciate that various configurations of the controller 152 having the same functions as above may be implemented.

The controller 152 may include a first SR flip-flop SR1 of which a first output Q is connected to the gate terminal of the MOSFET M1; a first comparator COMP1 of which an output is connected to a reset terminal R of the first SR flip-flop SR1, a first input + receives an electric current from the source terminal CS of the MOSFET M1, and a second input − receives a reference current IREF; a second comparator COMP2 (i.e., a transition comparator) of which a second input − receives an electric current flowing in the source terminal CS of the MOSFET M1 and a first input + receives the reference value GROUND; an AND gate of which a first input receives the output from the second comparator COMP2, and a second input receives the second output Qbar from the first SR flip-flop SR1; a second SR flip-flop SR2 of which a set terminal S receives the output from the AND gate; and a third comparator COMP3 of which a first input + receives an electric current flowing in the source terminal CS of the MOSFET M1, and a second input − receives the second output Qbar from the second SR flip-flop SR2. Also, the output of the third comparator COMP3 is input to the set terminal S of the first SR flip-flop SR1, and the first output Q of the first SR flip-flop SR1 is connected to the reset terminal R of the second SR flip-flop SR2.

The second comparator COMP2 compares the input current iM1 of the source terminal CS of the MOSFET M1 and the ground input. The second comparator COMP2 outputs a high value if the current iM1 is changed from negative to positive. At this time, the reference value to be compared with the current iM1 is the ground, such that the second comparator COMP2 detects a moment when the current iM1 is changed from negative to positive. However, the inventive concept is not limited to this. In practice, as shown in FIG. 11, since vD is maintained at 0 within the section t1–t2, the reference value to be compared with the current iM1 may alternatively be set to a value within a proper range (i.e., a value other than ground).

Below, a controlling operation of turning on/off the MOSFET M1 of the controller 152 according to an exemplary embodiment will be described with reference to FIG. 13.

While the gate of the MOSFET M1 is turned on, the current iM1 flowing in the resistor Rcs increases and the first SR flip-flop SR1 of the controller 152 is maintained in a set state.

When the current detected in the resistor Rcs reaches a reference current IREF, the first comparator COMP1 of the controller 152 outputs high. As a result, the first SR flip-flop SR1 is in a reset state, and the first output Q of the first SR flip-flop SR1 becomes low and the second output Qbar becomes high, thereby turning off the MOSFET M1.

When the MOSFET M1 is turned off, the current iM1 flowing in the resistor Rcs becomes zero and the current iL flowing in the inductor N1 decreases. At this time, in the controller 152, the second output Qbar of high of the first SR flip-flop SR1 is input to the second input of the AND gate after a predetermined blanking time passes through the blanking section. While the current iL decreases, the current iM1 is maintained at zero and the state of the controller 152 is also maintained as it is.

Then, when the current iL reaches zero, a negative resonance current −iM1 starts flowing in the resistor Rcs, and the second comparator COMP2 of the controller 152 outputs high, thereby making the second SR flip-flop SR2 be in the set state and the second output Qbar be in the low state. If the current iM1 flowing in the resistor Rcs is changed from negative to positive via zero while the resonance circuit L-Cds and the controller 152 maintain this state, the third comparator COMP3 outputs high, thereby changing the first SR flip-flop SR1 to be in the set state. As a result, the MOSFET M1 is turned on and the second SR flip-flop SR2 is in the reset state, so that the output of the third comparator COMP3 can become low. At this time, the outputs of the second comparator COMP2 and the AND gate become low, but the second SR flip-flop SR2 maintains the state without change. Further, the output of the third comparator COMP3 becomes low, and thus the set terminal S of the first SR flip-flop SR1 also becomes low, thereby maintaining the state of the first SR flip-flop SR1.

As described above, the section t1~t2 where vD is maintained at 0 is determined by detecting the current iM1 flowing in the resistor Rcs after the MOSFET M1 is turned off. That is, the point of time tzc2 (see FIG. 11) when the detected current iM1 is changed from negative to 0 is detected to turn on the MOSFET M1, and therefore the additional function of the controller 152 minimizes the power loss due to the operation of the switching device (i.e., MOSFET M1) without using additional parts.

Figure 14:
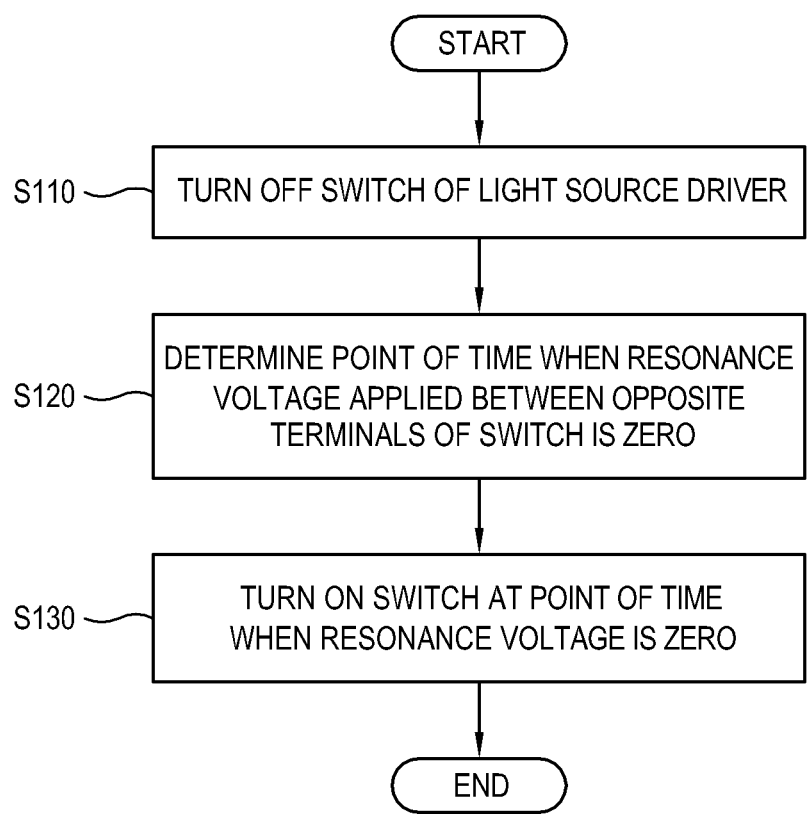
FIG. 14 is an example of a flowchart showing a light source driving method according to an exemplary embodiment.

FIG. 14 is an example of a flowchart showing a method of driving a light source driving apparatus according to an exemplary embodiment. For example, the light source driving apparatus may be the light source driving apparatus 150.

First, at operation S110, the MOSFET M1 is turned off. Consequently, the current iL of the inductor starts gradually decreasing while the voltage charged in the inductor N1 is discharged. Then, when the current iL decreases and becomes zero, the MOSFET M1 is reverse-biased and turned on so that the inductor N1 and the MOSFET M1 can form the resonance circuit.

At operation S120, after the MOSFET M1 is turned off, a point of time when the resonance voltage applied between the opposite terminals of the MOSFET M1 becomes zero is determined in the resonance circuit formed by the inductor and the MOSFET M1. To determine the point of time when the resonance voltage is zero, the voltage between the opposite terminals of the MOSFET M1 may be directly detected, or the current flowing in the MOSFET M1 may be detected. The method of using the current flowing in the MOSFET M1 to determine the point of time when the resonance voltage is zero is the same as explained with reference to FIG. 13.

At operation S130, the MOSFET M1 is turned on at the point of time when the resonance voltage is zero.

According to one or more exemplary embodiments, in the light source driving apparatus of the display apparatus, the power loss due to the operations of turning on/off the switching device is minimized, thereby controlling the power at high efficiency.

Although a few exemplary embodiments have been shown and described, it will be appreciated by those skilled in the art that changes may be made in these exemplary embodiments without departing from the principles and spirit of the inventive concept. Therefore, the foregoing has to be considered as illustrative only. The scope of the inventive concept is defined in the appended claims and their equivalents. Accordingly, all suitable modification and equivalents may fall within the scope of the inventive concept.

What is claimed is:

1. A light source driving apparatus comprising:
a light source configured to generate light;
a power source configured to generate power;
an inductor which is connected in series between the power source and an output to the light source;
a switch which is connected in parallel to the light source and between the inductor and the light source; and
a controller configured to turn on the switch at a point of time when a resonance voltage applied between opposite terminals of the switch is zero in a resonance circuit formed by the inductor and the switch after turning off the switch,
wherein the controller is configured to detect an electric current flowing in the switch in order to determine the point of time when the resonance voltage is zero.

2. The light source driving apparatus according to claim 1, wherein the controller is configured to detect whether the electric current flowing in the switch is changed from negative to positive.

3. The light source driving apparatus according to claim 1, wherein the switch comprises a metal oxide semiconductor field effect transistor (MOSFET), and
a resistor is connected in series to a source terminal of the MOSFET.

4. The light source driving apparatus according to claim 3, wherein the resonance voltage applied between the opposite terminals of the MOSFET becomes zero when a body diode of the MOSFET is reverse-biased after the MOSFET is turned off.

5. The light source driving apparatus according to claim 4, wherein the MOSFET has a duty rate of about 0.5 or higher.

6. The light source driving apparatus according to claim 3, wherein the controller comprises a transition comparator configured to receive the electric current flowing in the MOSFET after the MOSFET is turned off and compare the received electric current of the MOSFET with a reference input.

7. The light source driving apparatus according to claim 6, wherein the reference input comprises a ground input.

8. The light source driving apparatus according to claim 6, wherein the controller comprises:
a first SR flip-flop of which a Q output is connected to a gate terminal of the MOSFET;
a first comparator having an output connected to a reset input of the first SR flip-flop, a first input configured to receive the electric current from the source terminal of the MOSFET, and a second input configured to receive a reference current;
a second comparator which is the transition comparator, the second comparator having a first input configured to receive the reference input, and a second input configured to receive the electric current from the source terminal of the MOSFET;
an AND gate having a first input configured to receive an output from the second comparator, and a second input configured to receive a Qbar output from the first SR flipflop;
a second SR flip-flop having a set terminal configured to receive an output from the AND gate; and
a third comparator having a first input configured to receive the electric current flowing in the source terminal of the MOSFET, and a second input configured to receive a Qbar output of the second SR flip-flop,
wherein an output of the third comparator is input to a set terminal of the first SR flipflop, and
the Q output of the first SR flip-flop is connected to a reset terminal of the second SR flip-flop.

9. The light source driving apparatus according to claim 8, further comprising a blanking section between the Qbar output of the first SR flip-flop and the second input of the AND gate.

10. The light source driving apparatus according to claim 6, wherein the reference input comprises a non-zero threshold input.

11. A method of driving a light source driving apparatus comprising a light source configured to generate light, a power source configured to generate power, an inductor which is connected in series between the power source and the light source, and a switch which is connected in parallel to the light source and between the inductor and the light source, the method comprising:
turning off the switch;
determining at a point of time when a resonance voltage applied between opposite terminals of the switch is zero in a resonance circuit formed by the inductor and the switch after turning off the switch; and
turning on the switch at the point of time when the resonance voltage is zero,
wherein the determining the point of time when the resonance voltage is zero comprises detecting an electric current flowing in the switch.

12. The method according to claim 11, wherein the resonance voltage becomes zero when the electric current flowing in the switch is changed from negative to positive.

13. The method according to claim 11, wherein the switch comprises a metal oxide semiconductor field effect transistor (MOSFET), and a resistor is connected in series to a source terminal of the MOSFET.

14. The method according to claim 13, wherein the resonance voltage applied between the opposite terminals of the MOSFET becomes zero when a body diode of the MOSFET is reverse-biased after the MOSFET is turned off.

15. The method according to claim 14, wherein the MOSFET has a duty rate of about 0.5 or higher.

16. The method according to claim 13, further comprising receiving the electric current flowing in the MOSFET after the MOSFET is turned off, and comparing the received electric current of the MOSFET with a reference input.

17. The method according to claim 16, wherein the reference input comprises a ground input.

18. The method according to claim 16, wherein the reference input comprises a non-zero threshold input.

19. A display apparatus comprising:

a display panel configured to display an image;

a light source configured to emit light to the display; and a light source driver configured to drive the light source to control a quantity of light emitted from the light source, the light source driver comprising:

a power source configured to generate power;

an inductor which is connected in series between the power source and the light source;

a switch which is connected in parallel to the light source and between the inductor and the light source; and a controller configured to turn on the switch at a point of time when a resonance voltage applied between opposite terminals of the switch is zero in a resonance circuit formed by the inductor and the switch after turning off the switch, wherein the controller is configured to detect an electric current flowing in the switch in order to determine the point of time when the resonance voltage is zero.

\* \* \* \* \*